United States Patent [19]

Corrales

[11] Patent Number: 4,712,860
[45] Date of Patent: Dec. 15, 1987

[54] RETROFITTABLE OPTIC FIBER CONTACT ASSEMBLY

[75] Inventor: Patrick G. Corrales, Whittier, Calif.

[73] Assignee: ITT Corporation, New York, N.Y.

[21] Appl. No.: 755,246

[22] Filed: Jul. 15, 1985

[51] Int. Cl.⁴ .......................... G02B 6/36; G02B 7/26
[52] U.S. Cl. .................................................. 350/96.20
[58] Field of Search ................. 350/96.20, 96.21, 96.22

[56] References Cited

U.S. PATENT DOCUMENTS

| | | | |
|---|---|---|---|
| 4,470,660 | 9/1984 | Hillegonds et al. | 350/96.21 |
| 4,478,485 | 10/1984 | Khoe et al. | 350/96.21 |
| 4,483,584 | 11/1984 | Gresty | 350/96.21 |
| 4,496,213 | 1/1985 | Borsuk | 350/96.21 |
| 4,579,418 | 4/1986 | Parchet | 350/96.21 |
| 4,614,401 | 9/1986 | Strait | 350/96.21 |

Primary Examiner—William L. Sikes
Assistant Examiner—Robert E. Wise
Attorney, Agent, or Firm—T. L. Peterson

[57] ABSTRACT

An optic fiber contact assembly is described, which can be installed in a contact hole of a connector housing that was designed for holding front release electrical contacts. The assembly includes a central tube which holds the end of an optical fiber, an outer sleeve which surrounds the tube and which fits within the contact hole and is held by a front release clip therein, and a coil spring lying between the front ends of the tube and sleeve for biasing the tube forwardly. A guide sleeve clips onto the front of the tube, so the spring can be compressed between the rear end of the guide sleeve and a shoulder on the outer sleeve. The spring is preloaded by a clip which lies between the rear end of the outer sleeve and a shoulder formed on the rear end of the tube.

5 Claims, 6 Drawing Figures

OTHER ART

RETROFITTABLE OPTIC FIBER CONTACT ASSEMBLY

BACKGROUND OF THE INVENTION

There are many instances in which electrical conductors are replaced with optical fibers. The replacement can be facilitated by using the same connectors for connecting the ends of two optic fibers, that were previously used to connect the ends of a pair of electrical conductors, by replacing some or all of the electrical contact assemblies with optic fiber contact assemblies. Difficulties can be encountered in making such a replacement because of the difference in the way in which a pair of electrical contacts are coupled, with the way in which a pair of optic fibers are coupled.

A pair of electrical contacts are often coupled by having a pin contact of one conductor enter a socket contact of the other conductor, with the socket contact having resilient arms that press against the side of the pin contact to make electrical contact therewith. In optical coupling, a pair of optic fibers are coupled by pressing their extreme tips in abutment. Such abutment must be maintained without even a minute gap between them. This requires that one of the optic fiber contacts be spring biased towards the other, to assure firm abutment of the ends even if there is slight movement due to vibration or other causes. The pre-loading of the spring can be accomplished in a specially-designed connector contact hole, by pushing a guide sleeve at the front of the contact assembly against a shoulder formed near the front of the contact hole to compress the spring. However, the presence of such a shoulder at the front of the hole would prevent front release of the contact assembly, which is often a desirable feature. Furthermore, present connector housings that are designed for holding electrical contacts, are not constructed with such a shoulder near the front. An optical fiber contact assembly which was constructed so it could fit in the contact holes of a connector housing, where the contact holes do not have an undercut forming a shoulder near the front of the hole, would facilitate conversion of existing electrical connectors to optic fiber connectors.

SUMMARY OF THE INVENTION

In accordance with one embodiment of the present invention, a retrofittable optic fiber contact assembly is provided, which can fit into the contact holes of connectors designed for holding electrical contacts so the walls of the holes do not have undercuts for forming spring-compressing shoulders. The optic fiber contact assembly includes an outer sleeve which can fit into the contact hole of a connector housing, and an optic fiber tube which lies within the outer sleeve. A guide sleeve has fingers which can pass around the tip of a tube which has been pushed far forward. When the tube and guide sleeve are pushed rearward the rear of the guide sleeve compresses a coil spring lying around the tube. The spring is held in a compressed state by a clip that clips around a rearward portion of the tube to lie between shoulders at the rear of the tube and at the rear of the outer sleeve.

The novel features of the invention are set forth with particularity in the appended claims. The invention will be best understood from the following description when read in conjunction with the accompanying drawings.

DESCRIPTION OF THE PREFERRED EMBODIMENT

Figures 1, 2:
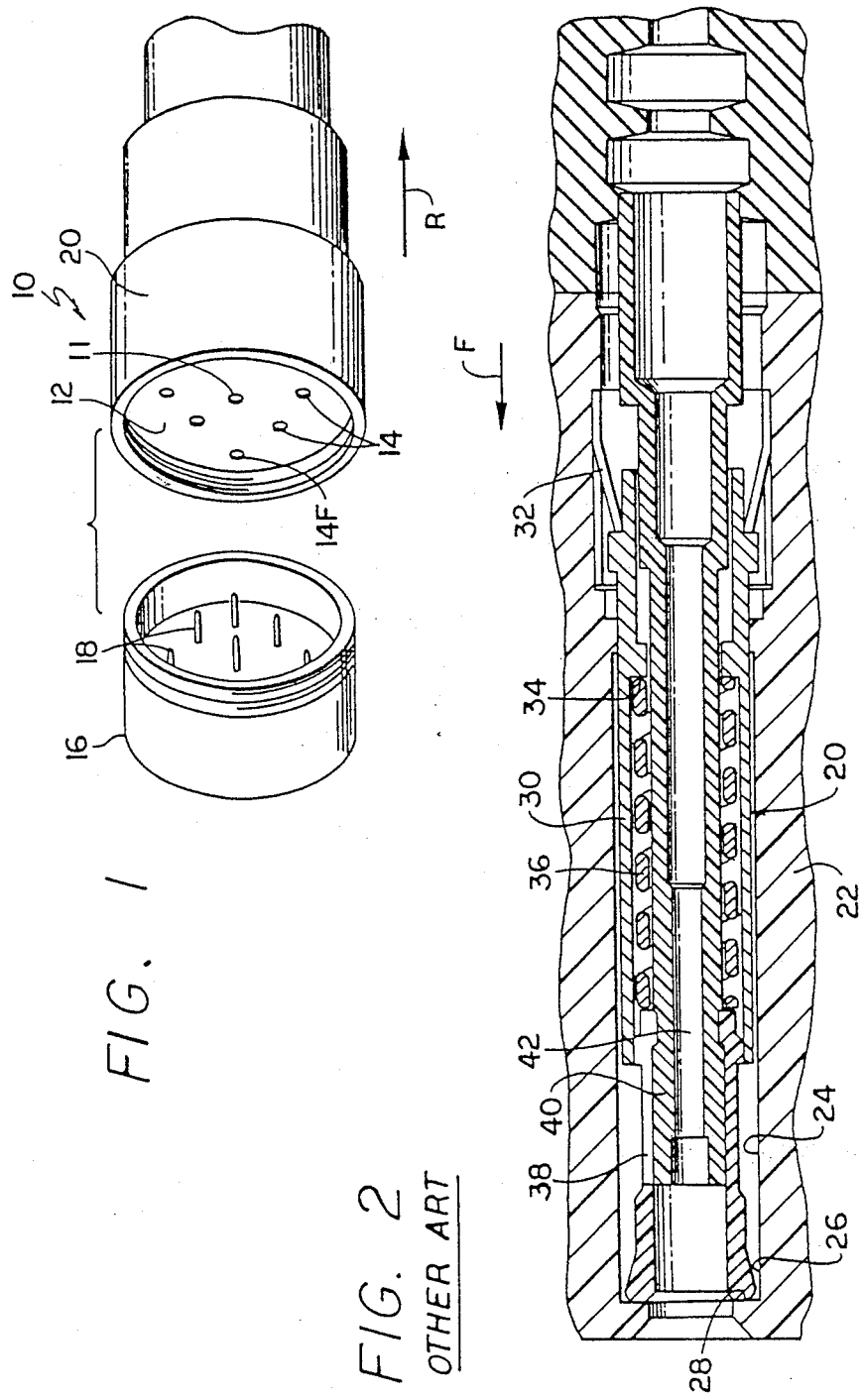
FIG. 1 is a perspective view of a connector system of the present invention with the connectors separated.
FIG. 2 is a sectional view of an optic fiber contact assembly of other art.

FIG. 1 illustrates a connector 10 which includes a housing 12 with a plurality of contact receiving holes 14 for holdings female or socket contacts. The connector 10 can be mated with another connector 16 which has a plurality of male or pin type contacts 18 which can be plugged into the socket contacts lying in the contact holes 14. Mating of the connectors is achieved by bringing them together at a proper orientation governed by a key (not shown) and turning a threaded shell 20 so its internal threads engage the external threads on the connector 16, to draw the plug contacts 18 firmly into the socket contacts in the holes 14.

The connector 10 is of the front release type which permits replacement of a socket contact by inserting a release tool into the front end 14F of a hole until the tool releases a clip deep within the hole to allow the contact to be pulled in a rearward direction R out of the housing. This type of connector has been widely used with electrical contacts wherein each socket contact had arms which received a pin contact of a shape similar to contact 18 and pressed against its outside. There are many instances where it is desirable to replace the electrical contacts with optical fiber contacts, wherein the coupling of two fiber ends is accomplished by having their tips press firmly against one another. A spring pressure must be maintained at all times to assure that the tips are constantly pressed against one another with moderate pressure. Difficulties can be experienced in trying to install an optical fiber contact assembly in a hole 14 that is designed for holding a simple electrical socket contact.

FIG. 2 illustrates an optic fiber contact assembly 20 which has been designed by the assignee of the present application. This contact assembly 20 has been designed for installation in a connector housing 22 that is designed especially for this contact assembly 20. In particular, each contact-receiving hole 24 has an undercut 26 which forms a rearwardly-facing shoulder 28. The contact assembly includes an outer sleeve 30 which can be pushed in a forward direction F into the hole 24 until a rear release clip 32 engages the sleeve to hold it in position. During the forward movement of the outer sleeve 30, a forwardly-facing shoulder 34 on the outer sleeve compresses a spring 36 against the rear of a guide sleeve 38. The front of the guide sleeve presses against the shoulder 28 to enable compression of the spring. The guide sleeve 38 is clipped onto the front of a tube 40 which surrounds and is bonded to an optical fiber 42. Thus, the shoulder 28 formed at the front end of the hole 24 provides a relatively simple method for compressing the spring 36 during installation of the contact assembly in the hole of the housing.

The presence of the shoulder 28 prevents release of the contact assembly by a common front release tool inserted into the front of the hole 24. This can be a disadvantage in ease of replacement of a damaged socket contact. Of even greater importance in many applications, is the fact that the undercut 26 and corresponding shoulder 28 are not present in connector housings that have been used to hold electrical contacts. This would prevent retrofitting of the optic fiber contacts in such prior electrical contact connectors.

Figure 3:
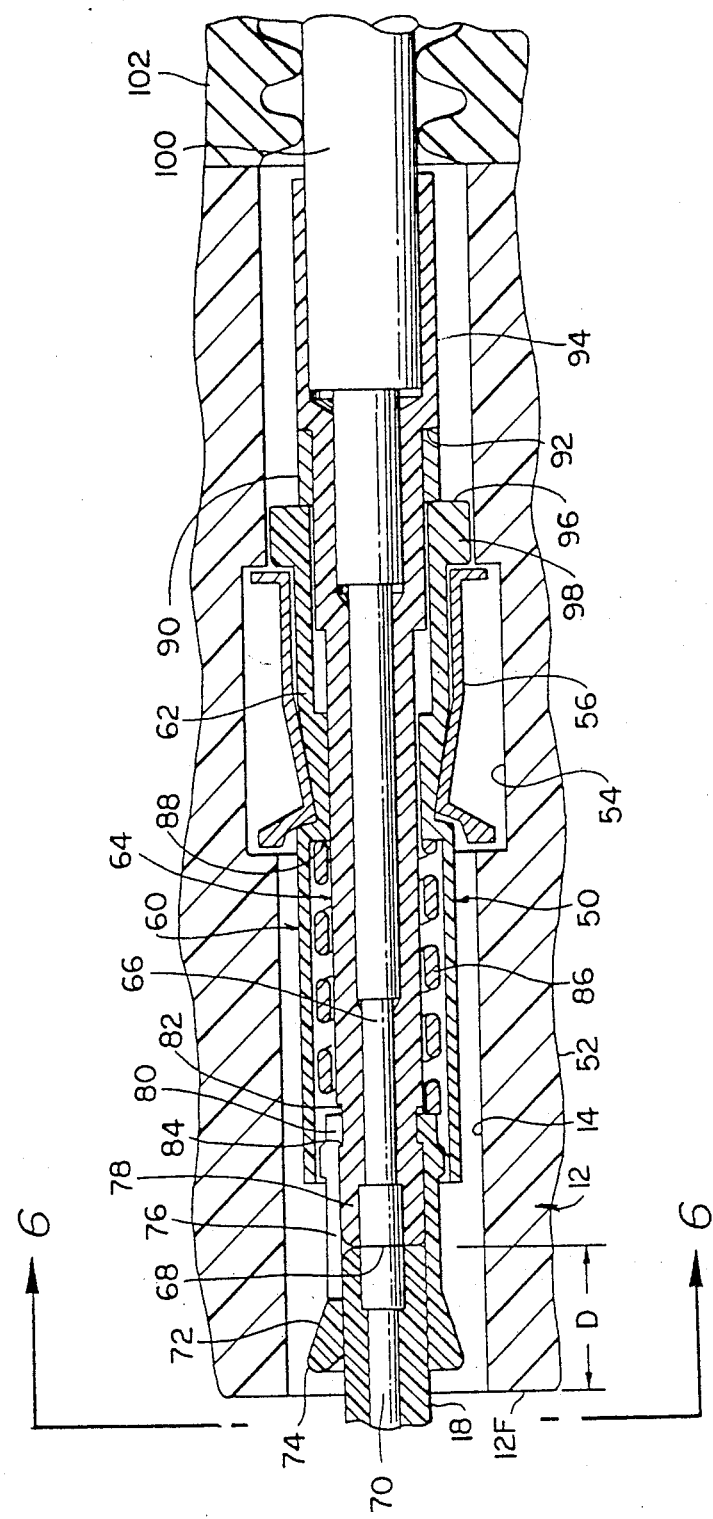
FIG. 3 is a sectional view of the connector in FIG. 1, showing an optic fiber contact assembly of the present invention, in a fully installed configuration.
Figure 5:
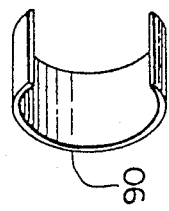
FIG. 5 is a perspective view of the clip of the assembly of FIG. 3.

FIG. 3 illustrates a connector assembly 50 constructed in accordance with the present invention, which can be installed in a contact-receiving hole 14 of an insulator 52 of a housing 12. The housing 12 also includes an internal groove 54 which holds a contact retaining clip 56. In this case, the housing 12 has been previously used to hold a front release electrical contact. The contact assembly 50 can be retrofitted into the housing 12 by removing the previous electrical contact and installing the optical fiber contact assembly 50 in its place.

The contact assembly 50 includes an outer sleeve 60 with a retainer-clip engaging portion 62 which can be engaged by the retaining clip 56 to hold the outer sleeve in place, in the same manner as an electrical contact is held in place. The contact assembly also includes an optic fiber tube 64 which lies within the outer sleeve 60. An optic fiber 66 lies within the tube and is bonded thereto. The optic fiber has a forward end 68 which is ground and polished flat, and which can abut the end of another optic fiber 70 of a male contact 18 to couple the two optic fibers. It may be noted that the optic fiber 68 has several layers of jacketing thereof, which lie within more rearward sections of the tube 64.

A guide sleeve 72 of the connector assembly is attached to the front portion of the tube 64 and extends forwardly thereof. The front of the guide sleeve guides a pin contact 18 into alignment with the tube 64. The guide sleeve 72 forms a continuous ring at its forward portion 74, but has three slots extending along its rearward portion to form three fingers 76 that can pass around the forward end portion 78 of the tube until a rear end 80 of the arms fall into a groove or recess 82 in the tube. The rear ends 80 of the arms can then abut a rearwardly-facing shoulder or ledge 84 on the tube to hold the guide sleeve in place.

A coil spring 86 lies in the clearance space between the forward portions of the outer sleeve 60 and the tube 64. The rear end of the spring can press against a forwardly-facing shoulder 88 on the outer sleeve, while the front end of the spring can press against the rear end 80 of the guide sleeve. When a pin contact 18 is pressed firmly against the tip or front end 68 of the optic fiber and tube, the spring 86 is compressed. During the time when the connectors of FIG. 1 are mated, the spring is compressed. As a result, if there is vibration or the like which causes the pin contact 18 and housing 12 to separate slightly the spring will constantly force the tip 68 of the tube and fiber combination forwardly into firm contact with the tip of the pin contact 18.

It is important that the coil spring 86 be maintained under at least slight compression prior to mating if the socket contact assembly 50 with the pin contact 18. Such pre-compression assures that even when the pin contact 18 is forced inward only a small distance after contacting the front end 68 of the tube and fiber combination, that the spring will be compressed to constantly push the tip of the tube forwardly. Applicant maintains such pre-compression or pre-loading of the spring by the use of a spring preload clip 90. The clip 90 lies between a forwardly-facing shoulder 92 on the rear portion 94 of the tube, and a rearwardly-facing shoulder 96 on the rear portion 98 of the outer sleeve. The clip has a predetermined length, which assures that the tip 68 of the tube and fiber combination will lie a predetermined distance D behind the forward face 12f of the housing of the connector, the distance D being long enough to assure that the coil spring will be partially compressed.

Figure 4:
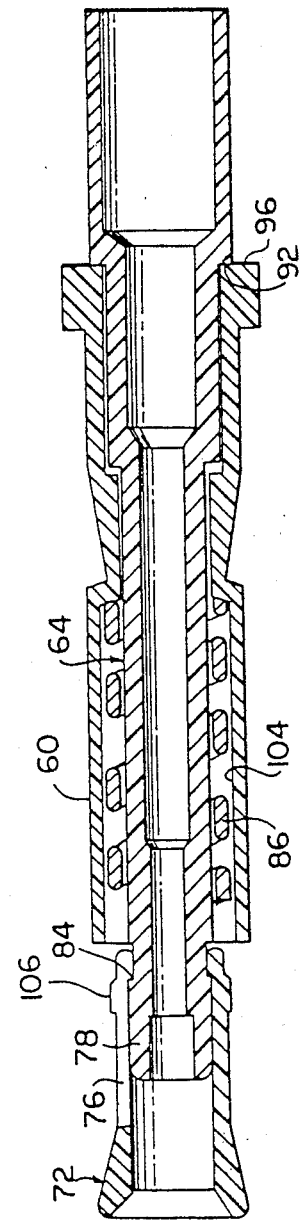
FIG. 4 is a sectional view of the contact assembly in FIG. 3, shown during its assembly.
Figure 6:
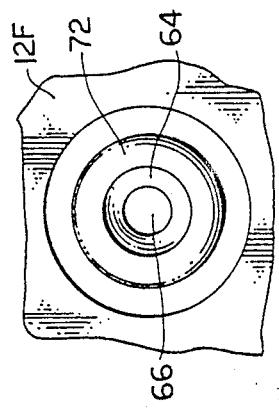
FIG. 6 is a view taken on the line 6—6 of FIG. 3, but without the mating contact.

The contact assembly 50 is assembled by first projecting an optic fiber device 100, whose forward portion has been stripped of various portions of its jacket, through a rubber grommet 102 of the connector housing. The optic fiber tube 64 may be already installed around the front of the optic fiber. As shown in FIG. 4, the outer sleeve 60 is slid over the front of the tube until shoulders 96,92 on the rearward portions of the outer sleeve and tube substantially abut one another. The coil spring 86 is then slid into the clearance space 104 between the front portions of the outer sleeve and tube. The forward end 78 of the tube then lies forward enough that the tube ledge 84 is forward of the forward end of the outer sleeve. This allows the arms 76 of the guide sleeve 72 to expand around the forward end of the tube and snap behind the tube ledge 84. The tube 64 is then moved rearwardly so the spring 86 is compressed, until there is sufficient space between the shoulders 92, 96 at the rearward portions of the tube and outer sleeve to allow the clip 90 to be clipped around the tube just forward of its shoulder 92. The guide sleeve 72 is then far enough back that a bearing portion 106 on it can ride within the inside of the outer sleeve. The assembled contact assembly can then be projected through the rearward end of the insulator 52 until the assembly reaches the position shown in FIG. 3, wherein the retaining clip 56 snaps into the recess 62 in the outer sleeve.

The contact assembly can be replaced, when damaged, by inserting a cylindrical front release tool (not shown) into the front end of the contact hole 14, and sliding it around the outer sleeve 60 until the rear of the release tool engages the front of the retaining clip 56. Rearward pressure on the front of the clip 56 causes it to expand, and allow rearward movement of the contact assembly 50 out of the hole 14 in the housing. The contact assembly 50 can therefore be removed by a front release tool and reinstalled, all in the same manner as a front release electrical contact which can alternatively be installed in the housing 12. This allows rapid replacement of an electrical contact with an optic fiber contact assembly, during switchover between electrical to optic fiber signal-carrying conduits. Both electrical and optic fiber contacts can lie in the same connector, and FIG. 1 shows one electrical contact 11.

Thus, the invention provides a retrofittable optic fiber contact assembly, which can be installed in a contact-receiving hole of a housing that can alternatively hold a common front release electrical contact. Such a hole is devoid of an undercut at its front end for use in compressing a coil spring. Applicant is able to compress the coil spring so it is pre-loaded, and so the tip of the optic fiber tube and the optic fiber therein lie a predetermined distance rearward of the front face 12F of the housing. The position of the tip 68 of the tube and fiber combination is assured by the fact that the clip 90 holds the tube shoulder 92 a predetermined distance behind the outer sleeve shoulder 96. The outer sleeve is held at a predetermined location within the housing 12.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optic fiber contact assembly adapted to be installed in a connector housing that has contact holes each capable of instead holding an electrical contact, comprising:
    an outer sleeve with forward and rearward ends, said sleeve having a contact retaining-clip engaging portion and a forward-facing spring abutting surface;
    an optic fiber tube slidable within said outer sleeve, said tube having a forward end lying near the forward end of the outer sleeve, said tube having a rearwardly-facing shoulder, thereon and a forwardly facing shoulder spaced rearward of said rearwardly-facing shoulder;
    a coil spring surrounding said tube, said spring having a rearward end which lies adjacent to said spring-abutting surface of said outer sleeve, and said spring having a forward end which lies adjacent to said rearwardly-facing shoulder on said tube; and
    a spring pre-loading clip which lies about said tube and abuts said forwardly-facing shoulder of said tube and the rearward end of said outer sleeve, said pre-loading clip having a sufficient length to push said tube rearwardly relative to said outer sleeve far enough to compress said spring along its length.

2. In a connector which has a plurality of contact holes with front ends, each hole containing a front release retaining clip lying a distance behind said front end, each hole being free of a shoulder between the front end and said retaining clip, the improvement of an optic fiber contact assembly installed in said connector in one of said contact holes to hold an optic fiber, comprising:
    an outer sleeve having front and rear ends and having a groove on its outside receiving said retaining clip to restrict axial movement of said outer sleeve in said hole, said outer sleeve having a rearward end portion which forms a rearwardly-facing shoulder, and said outer sleeve having a forwardly-facing shoulder adjacent to the front end of the sleeve;
    a tube which slideably fits within said outer sleeve and which has a central hole for holding an optic fiber, said tube having a rearward portion with a forwardly-facing shoulder, and said tube having a forward portion provided with a rearwardly facing shoulder;
    a spring on said tube, the spring having a rear end which abuts the forwardly-facing outer sleeve shoulder and the spring having a front end which abuts said tube rearwardly facing shoulder, said spring being under compression between its ends between said forwardly-facing outer sleeve shoulder and said tube rearwardly facing shoulder;
    spacer means which lies between said rearwardly-facing shoulder on said outer sleeve and said forwardly-facing shoulder on said tube, to keep them a distance apart that maintains said spring in compression.

3. The improvement described in claim 2 wherein: another of said contact holes holds a front release electrical contact.

4. The improvement described in claim 2 wherein: said spacer means comprises a longitudinally split resilient clip.

5. A method of assemblying an optic fiber contact assembly in a contact hole of a connector housing, where the housing can be used to hold a front release electrical contact by use of a front release retaining clip in the contact hole, comprising:
    sliding a tube with an optic fiber therein, forwardly into an outer sleeve, until a forward facing shoulder on the rear portion of the tube substantially abuts a rearward-facing shoulder at the rear portion of the outer sleeve, the tube being long enough so that its forward end then lies forward of the forward end of the outer sleeve, there being a rearwardly facing shoulder on the forward end of the tube and a forwardly facing shoulder on said sleeve adjacent to the front end of said sleeve and located behind said rearwardly facing shoulder;
    installing a coil spring over the forward end of the tube to lie between said rearwardly facing shoulder on the tube and said forwardly facing shoulder on said sleeve;
    moving the tube rearwardly with respect to the outer sleeve by a predetermined amount that compresses said coil spring;
    installing a pre-load clip around said tube at a location between said forward-facing shoulder on the tube and said rearward-facing shoulder of said outer sleeve, said clip being long enough to keep said spring under compression; and
    installing the outer sleeve, with the tube and optic fiber, and pre-load clip into the rear end of said contact hole and deep into said contact hole until the front release retaining clip engages the outer sleeve.

* * * * *